United States Patent [19]

Staggs

[11] Patent Number: 5,136,635
[45] Date of Patent: Aug. 4, 1992

[54] APPARATUS AND METHOD FOR SECURING AN ARMORED CORD AND RESTRAINT CABLE ASSEMBLY TO A TELEPHONE HANDSET AND HOUSING

[76] Inventor: Gregory D. Staggs, 218 Main Rd., Lake Mary, Fla. 32746

[21] Appl. No.: 572,152
[22] Filed: Aug. 23, 1990
[51] Int. Cl.⁵ .............................................. H04M 1/15
[52] U.S. Cl. ..................................... 379/145; 379/438
[58] Field of Search ............... 379/143, 145, 438, 451, 379/155

[56] References Cited

U.S. PATENT DOCUMENTS 4,974,258 11/1990 Arzounian et al. .................. 379/145

Primary Examiner—Stafford D. Schreyer

[57] ABSTRACT

Apparatus and methods are disclosed for anchoring each end of an armored telephone cord and restraint cable assembly to both the telephone housing and the associated handset. With respect to the handset, a removable anchor is positioned intermediate the receiver and transmitter ends along the hand-grip portion, the inside walls of the hand-grip being provided with a ledge or other means for transmitting longitudinal pulling forces along the restraint cable as a shear force along the peripheral sidewalls of the hand-grip portion.

The housing anchor is specifically adapted for elbow type public telephones, and utilizes an elbow with the extremity of the armored telephone cord and restraint cable assembly and the cable stop fitted into the elbow generally parallel with the sidewall of the housing.

19 Claims, 5 Drawing Sheets

APPARATUS AND METHOD FOR SECURING AN ARMORED CORD AND RESTRAINT CABLE ASSEMBLY TO A TELEPHONE HANDSET AND HOUSING

BACKGROUND OF THE INVENTION

The present invention is directed to an apparatus and a related method for anchoring the two ends of an armored telephone cord and restraint cable assembly to both the telephone housing and the associated telephone handset.

Public telephones are used in a wide variety of locations and under a variety of conditions, and are frequently subjected to rigorous and indeed often vandalous abuse. Accordingly, it has been a practice in the public telephone industry to utilize an armored cord and restraint cable assembly for connecting the telephone handset to the associated housing. The typical telephone armored cord and restraint cable assembly comprises a central restraint cable having a tensile strength on the order of 1,000 pound test or greater, and which is surrounded by the electrical wires that extend between the housing and the handset for carrying electronic signals between them. The restraint cable and the telephone wires are surrounded with an armored sheath fabricated of a helically-wound metal strip, in order to protect the wires and facilitate the flexure of the restraint cable-wire-armored sheath combination. At one end the armored cord and restraint cable assembly extends from inside the telephone housing and to the other end into the handset. The restraint cable then extends longitudinally along the hollow handle portion of the handset, with the electrical wires being distributed to the respective transmitter and receiver ends of the handset (present industry practice uses a handset in which the armored cord and restraint cable assembly extends through the handset at the transmitter end).

One of the problems associated with a public telephone employing an armored cord and restraint cable assembly is the necessity for anchoring the two ends of the assembly both in the telephone housing and inside the handset. The anchoring of each end provides special problems dependent upon the type of public telephone in use.

U.S. Pat. No. 4,518,830 to Drexler et al discusses in detail prior art techniques used in the public telephone industry for anchoring both ends of an armored cord and restraint cable assembly. One disclosed by Drexler et al for anchoring the armored cord and restraint cable assembly inside the handset employs fixed molded upstanding walls inside the handgrip portion of the handset with a restricted opening adjacent the receiver end for holding a stop attached at the extremity of the restraint cable. (See FIG. 3 in the Drexler et al patent). A second anchoring technique taught by Drexler et al employs a removable wedge-shaped anchor which fits into the restriction at the interface between the hollow handle and the receiver end of the telephone (see FIGS. 9 and 11 of the Drexler et al patent).

Drexler et al also disclose techniques for anchoring the armored cord and restraint cable assembly inside the telephone housing, one of which is suited for the elbow arrangements found in some public telephones, particularly those frequently utilized in European and other foreign countries; in this regard, Drexler et al disclose an elbow extending the stop for the restraint cable inside the telephone housing (see FIGS. 4-7 of the Drexler et al reference).

U.S. Pat. No. 4,845,774 to Arzounian also discloses techniques for anchoring an armored cord and restraint cable assembly in both the telephone housing and the associated handset. The handset anchoring arrangement taught by Arzounian employs a shaped anchor member having a compound surface with first and second radii of curvature so as to be in substantially full surface contact with the interior surface of the handset at the junction of the handset yoke and receiver. U.S. Pat. No. 4,837,815 to Brancati also discloses an anchor for an armored cord and restraint cable assembly employing a shaped anchor at the juncture of the yoke and receiver sections of the handset; European Patent Application H 7,109,200.3 contains a corresponding disclosure of Brancati's technique.

Other prior art of interest includes the following: U.S. Pat. No. 2,200,794 to Krantz; U.S. Pat. No. 3,384,393 to Horton et al; and U.S. Pat. No. 3,290,429 to Prescott et al.

SUMMARY OF THE INVENTION

The present invention is directed to apparatus and related methods for anchoring both ends of an armored telephone cord and restraint cable assembly to the respective telephone housing and telephone handset.

With respect to the telephone handset anchoring technique, the present invention contemplates the use of a removable restraint cable anchor positioned along the hollow hand-grip portion of the handset, with the restrain cable fixed to that anchor. In this arrangement, the inner sidewalls of the hollow hand-grip portion are provided with means for restraining the anchor against movement toward the transmitter end in response to an external force along the restraint cable, so that any of the longitudinal forces caused by heavy pulling (either accidental or intentional) upon the restraint cable are transmitted as shear forces longitudinally along the sidewalls of the handgrip portion. To this end, in one embodiment the restraining means comprises one or more ledges along the periphery of the internal side surfaces of the hand-grip portion. To further facilitate the strengthening of the sidewalls of the hand-grip portion, one or more of those walls may be thickened including any ledge portion which restrains movement of the removable anchor. The removable anchor is provided with an appropriate opening for receiving a restraint cable stop of greater diameter, and may include a slot to facilitate passage of electrical wires to the receiver end of the handset.

In accordance with the present invention, the ledge which forms the restraining means may either engage the removable anchor along the bottom surface, or alternatively be shaped in conformity with a ledge or protrusion along a side surface of the removable anchor.

The present invention also contemplates an anchoring technique for use with a telephone housing of the type employing a removable elbow for joinder of the handset cord assembly to the telephone housing. Unlike the arrangement disclosed in the above-described Drexler et al patent and shown in FIGS. 4-7 therein, the elbow anchoring apparatus and method of the present invention employs a technique which anchors the cable stop attached to the housing end of the armored cord and restraint cable assembly outside of the housing and in a direction extending generally parallel with the side surface of the housing into which telephone wires are extended. To this end, the elbow is provided with a pair of prongs and a shaped opening for receiving the cable stop and holding the stop in a generally flat, parallel relationship with respect to the housing side surface. The elbow is conventionally attached to the side surface of the telephone housing via a C-ring or other conventional locking feature.

THE DRAWINGS

DETAILED DESCRIPTION

A detailed description of the handset anchoring arrangement of the present invention will now be described with reference to FIGS. 1-5.

Figure 1:
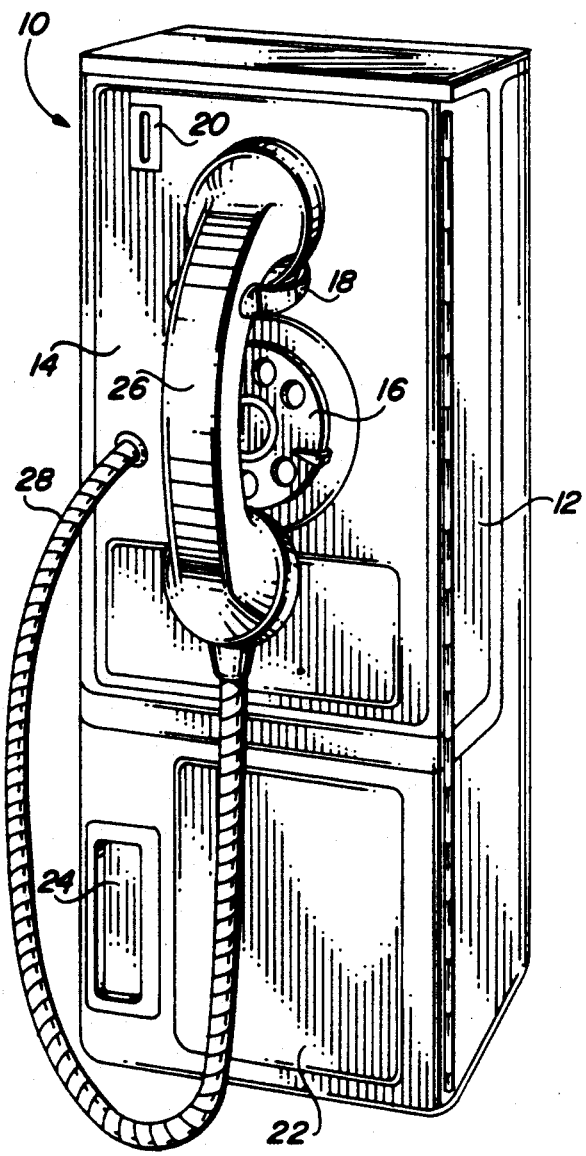
FIG. 1 is a perspective view of a conventional public telephone housing and handset combination of the type which utilizes an armored telephone cord and restraint cable assembly anchored into the handset in accordance with the techniques of the present invention.

As shown in FIG. 1, a typical public telephone, referred to generally by the reference numeral 10, includes a telephone housing 12 having a surface 14 to which a dial 16 and handset cradle 18 are attached. Conventionally, the public telephone 10 includes a coin opening 20, a coin box 22 and a coin return 24.

Figure 2:
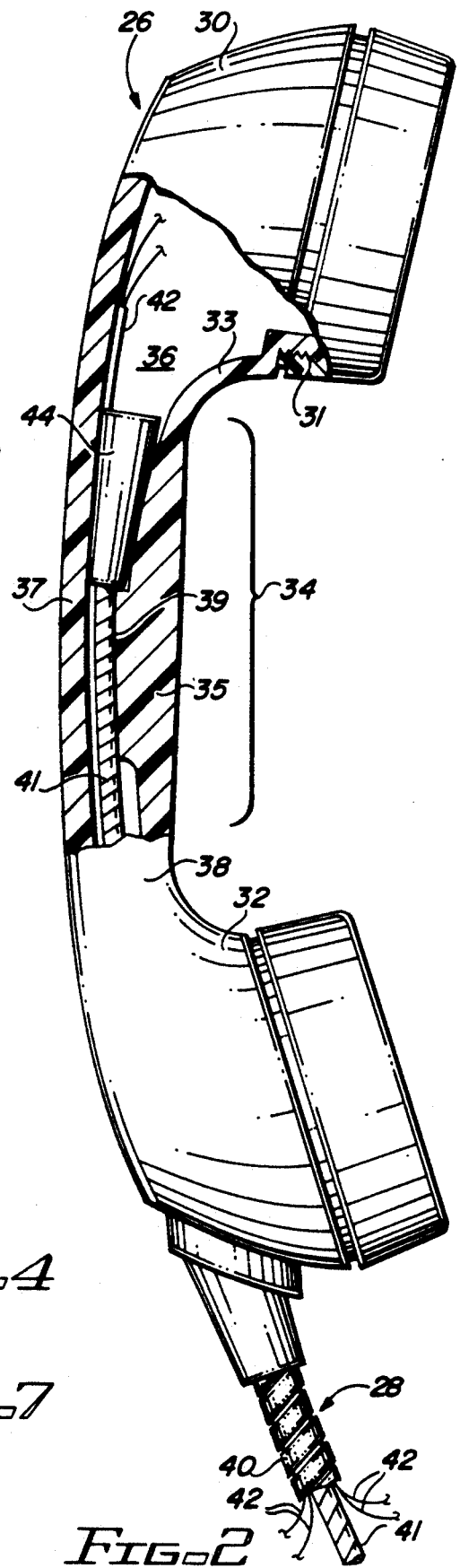
FIG. 2 is a side elevation, partially cut away, of a telephone handset employing one form of an anchor for the armored cord and restraint cable assembly in accordance with the present invention.

The public telephone 10 further includes a handset 26 which is electronically and mechanically connected to the housing 12 via an armored cord and restraint cable assembly 28. As shown in FIG. 2, the armored cord and restraint cable assembly 28 includes an outer armored sheath 40, multiple electrical wires 42 and a restraint cable 41. Typically, a cable stop 43 (see FIG. 3) of substantially greater diameter than the restraint cable 41 is attached to the extremity of the restraint cable in the handset 26.

Referring now specifically to FIGS. 2-5, the handset 26 includes a receiver end 30, a transmitter end 32 and a hand-grip portion 34 (the hand-grip portion is sometimes referred to as the "yoke"). The hand-grip portion 34 is defined by four peripheral sidewalls 35, 36, 37 and 38 which are typically in a rectangular configuration and with corresponding internal sidewalls defining a hollow area through which the electronic wires 42 and the restraint cable 41 extend. The handset 26 is usually fabricated from a molded plastic, with the covers for the receiver 30 and transmitter 32 being threaded on to the respective ends, as shown by threads 31 in FIG. 2.

A removable restraint cable anchor 44 is fitted into the handgrip portion 34 of the handset 26 and between the receiver and transmitter ends 30, 32. It is preferred that the removable anchor 44 be positioned along the hand-grip portion 34 away from the thin gauged portion 33 of the sidewall 35 which curves into the receiver end 30. One or more of the peripheral sidewalls 35-38 of the hand-grip portion 34 are provided with means for restraining the anchor 44 against movement through the hand-grip portion 34 toward the transmitter end 32. In the arrangement of FIGS. 2-5, this is achieved using a single ledge 39 along the inside peripheral sidewall 35 It is also noted that further strengthening can be achieved by the thickening of that sidewall 35. It will of course be appreciated that the positioning of the removable anchor 44 along the hand-grip portion 34 and the use of the ledge 39 causes pulling forces exerted upon the armored cord and restraint cable assembly 28, including the restraint cable 41, to be transmitted as a shear force downwardly along the inside peripheral sidewall 35, as opposed to being transmitted through the thinned portion 33 of the sidewall 35 that curves into the receiver end 30. Accordingly, the peripheral sidewall arrangement shown in FIG. 2 permits extremely high longitudinal forces to be applied to the restraint cable 41 without breaking the plastic materials that are normally used in the fabrication of the handset 26. The thickening of the inside peripheral sidewall 35 at the ledge 39 contributes to an even greater strengthening against such longitudinal pulling along the restraint cable 41.

Figure 4:
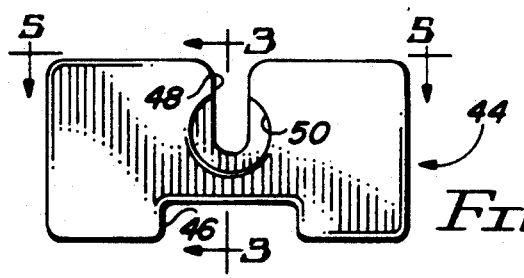
FIG. 4 is a top view of the removable anchor shown in FIG. 3.
Figure 3:
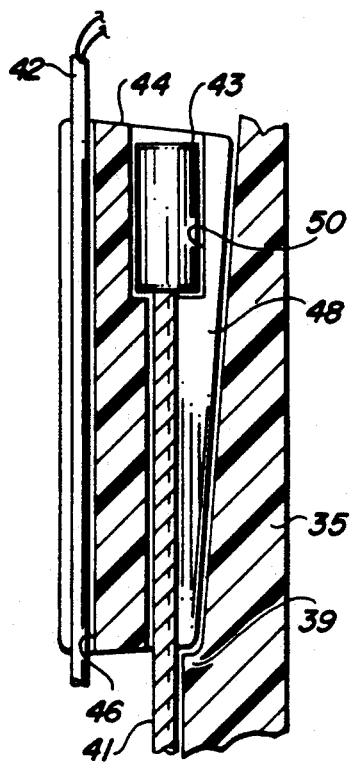
FIG. 3 is a side elevation, in cross section, of the removable anchor and restraining means used with the handset of FIG. 2.
Figure 5:
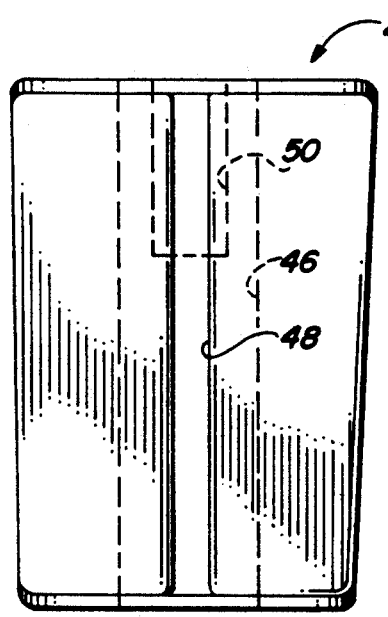
FIG. 5 is a front elevation of the removable anchor shown in FIGS. 3 and 4.

Details of the removable anchor 44 are illustrated in FIGS. 3-5. There, it is seen that one form of the restraint anchor 44 includes a first slot 46 along the rear for receiving the electrical wires 42 that pass along the handgrip portion 34 to the receiver end 30 (also note FIG. 2). A second slot 48 extends centrally into the removable anchor 44 and into a central opening 50 which is dimensioned to receive the cable stop 43 attached to the end of the restraint cable 41. The restraint cable may be easily slipped through the slot 48 and extended downwardly toward the transmitter end so that the cable stop 43 engages in the opening 50.

Figure 7:
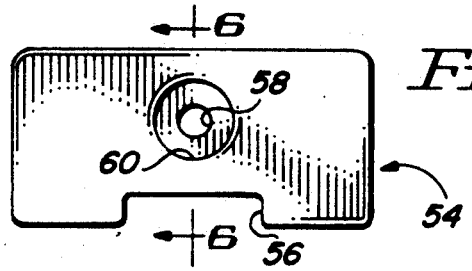
FIGS. 6 and 7 are, respectively, a side elevation in cross section and a top plan view of another form of the removable anchor of the present invention.
Figure 6:
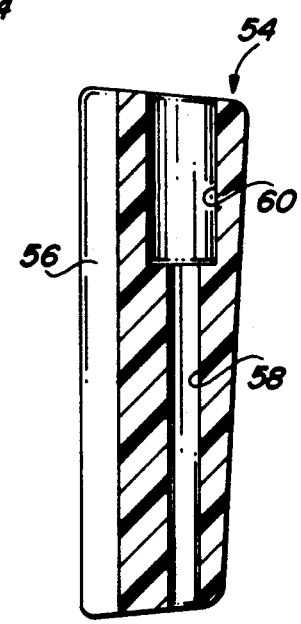

A second form of a removable anchor 54 is shown in FIGS. 6 and 7. The removable anchor 54 includes a slot 56 for receiving the electrical wires 42, and a longitudinal hole 58 communicating with an opening 60, the opening 60 dimensioned to receive the cable stop 43. The anchor 54 is thus essentially identical to the anchor 44 of FIGS. 3-5, except that a portion of the slot 48 is omitted.

Figure 8:
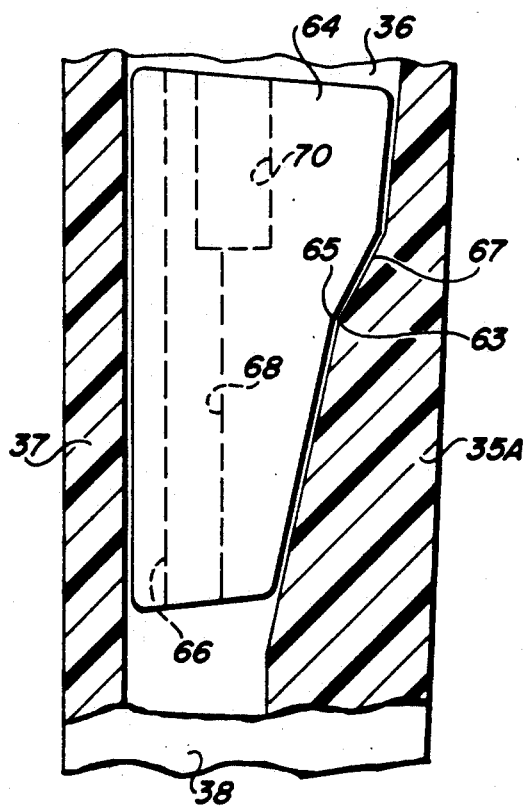
FIG. 8 is a side elevation, partially in cross section, of a portion of a telephone handset and an alternate form of a removable anchor in accordance with the present invention.
Figure 9:
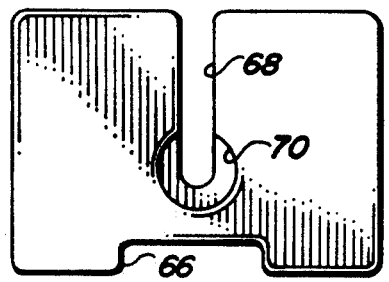
FIG. 9 is a top plan view of the removable anchor shown in FIG. 8.

Another form of a removable anchor 64 is shown in FIGS. 8 and 9. The anchor 64 has a protrusion or ledge 65 along the front surface 67 of the anchor 64. The peripheral sidewall 35A of the hand grip portion 34 in the form of FIG. 8 includes a corresponding ledge or protrusion 63 which mates with the protrusion or ledge 65 along the front surface 6 of the anchor 64.

As shown in FIG. 9, the anchor 64 also includes a slot 66 for receiving the electrical wires 42 passing along to the receiver end 30 of the handset, and a slot 68 and opening 70 for receiving the restraint cable 41 and the cable stop 43.

Figure 10:
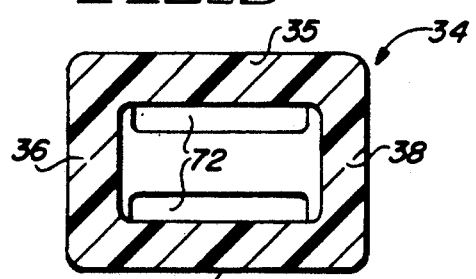
FIGS. 10-12 are cross sectional top views of three alternate embodiments of the restraining means in the handgrip portion of the handset used with the present invention.
Figure 11:
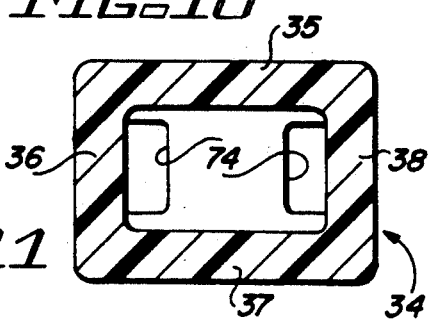
Figure 12:
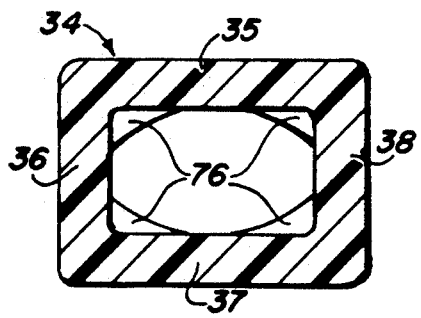

As described above and shown in FIG. 2, the ledge 39 is molded along the inner sidewall 35 of the hand-grip portion 34. Other suitable ledge arrangements are shown in FIGS. 10-12. In FIG. 10, a pair of ledges 72 may be placed on the inside of the opposing of inner and outer sidewalls 35, 37. In FIG. 11, opposing ledges 74 are molded along the sidewalls 36, 38. In FIG. 12, corner ledges 76 are molded between adjacent sidewalls 35-38. The ledges shown in FIGS. 10-12 are positioned along an intermediate portion of the internal passageway of the hand-grip portion 34 defined by the sidewalls 35-38, in order to engage the particular form of the removable anchor 44, 54 or 64.

Figure 14:
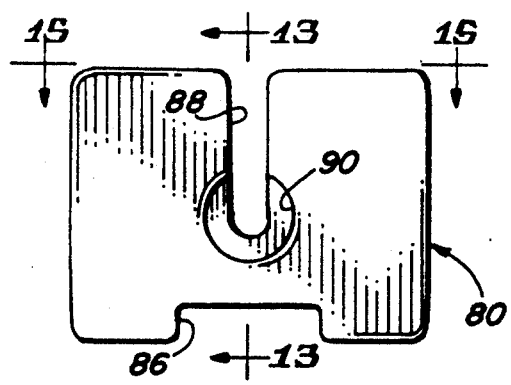
FIGS. 14 and 15 are top and front views, respectively, of the anchor shown in FIG. 13.
Figure 13:
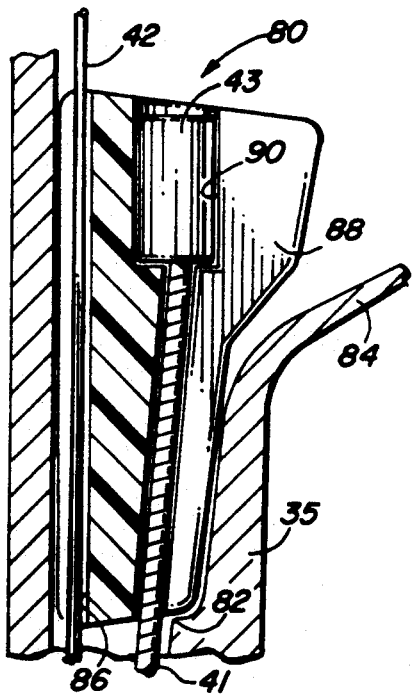
FIG. 13 is a side elevation, partially in cross section, of a portion of a telephone handset and another form of a removable anchor in accordance with the present invention.
Figure 16:
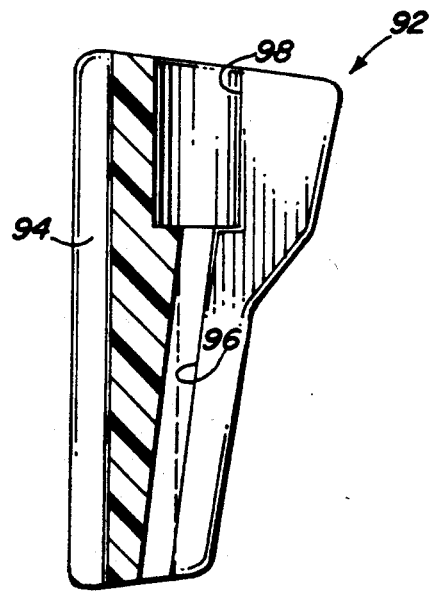
FIGS. 16 and 17 are a cross sectional side view and a top view, respectively, of another form of an anchor in accordance with the present invention.
Figure 15:
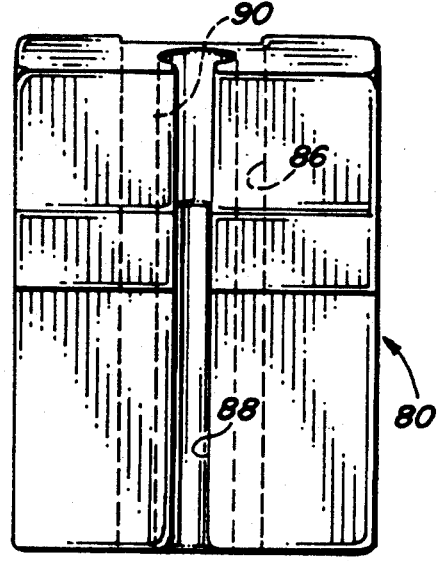
Figure 17:
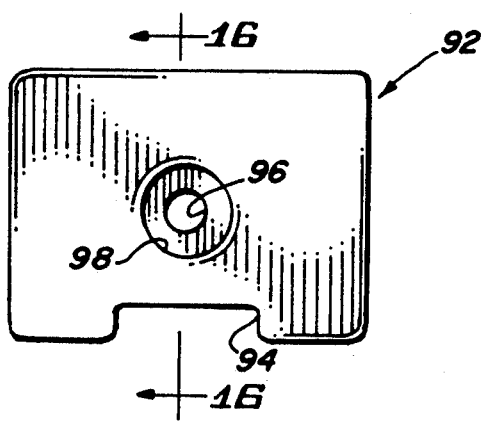

Another form of the removable anchor in accordance with the present invention is shown and described with reference to FIGS. 13-15. In this arrangement, the anchor, referred to generally by the reference numeral 80, is supported by a ledge 82 somewhat below the curvature 84 of the receiver end of the handset. Like the arrangement of FIG. 3, the anchor 80 includes a first slot 86 for receiving the wires 42, and a second slot 88 dimensioned to receive the restraint cable 41, so as to be engaged in an opening 90. A similar form of the invention is shown in FIGS. 16 and 17, and is identified by the reference numeral 92. This arrangement includes a first slot 94 for receiving the wires, a second slot 96 for receiving the restraint cable, and an opening 98 for receiving the restraint cable stop.

It will thus be appreciated that any ledge, protrusion or thickened wall portion along any sidewall (or between sidewalls) of the hand-grip portion of the telephone may likewise have a mating relationship with any protrusion or ledge along any corresponding wall of the removable anchor.

A form of the telephone housing anchoring system and method in accordance with the present invention will now be described with reference to FIGS. 18-21.

Figure 18:
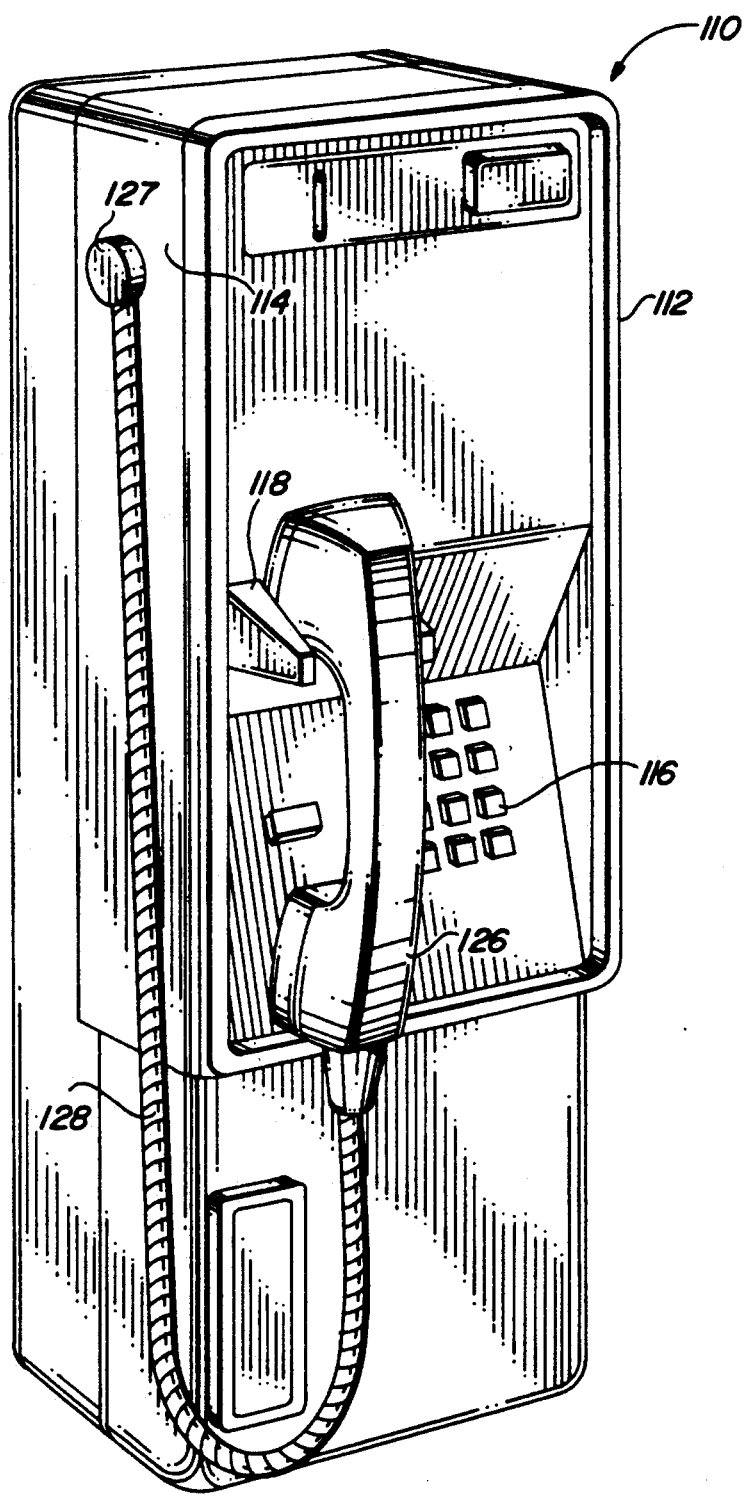
FIG. 18 is a perspective view of a public telephone housing and handset assembly utilizing an elbow junction between the handset cable and the telephone housing.

As shown in FIG. 18, a conventional public telephone 110 has a housing 112 and a side surface 114 to which is attached an elbow 127. The telephone 110 also includes a key pad 116, a handset cradle 118 and an armored telephone cord and restraint cable assembly 128 essentially identical to the assembly 28 shown and described with reference to FIGS. 1-3. It will of course be observed that the end of the telephone cord and restraint cable assembly 128 in FIG. 18 differs significantly from the arrangement of FIG. 1; in the arrangement of FIG. 18, the assembly 128 at the housing passes into the elbow 127 along the sidewall 114 of the housing 112, whereas in the arrangement of FIG. 1, the assembly 28 extends into a front plate 14 of the housing 12. The use of "elbow junction" public telephone housing arrangements like that shown in FIG. 18 is particularly prevalent in European and other foreign countries, although some use of public telephones of that type is also made in the United States. However, many "elbow junction" public telephones presently in use have armored handset cords without restraint cables, and do not have means for easily retrofitting an armored telephone cord and restraint cable assembly of the type discussed above.

The arrangement shown and described next with reference to FIGS. 19-21 permits the easy and rapid retrofitting of the elbow junction 127 of the public telephone 110 so as to utilize the armored telephone cord and restraint cable assembly 128.

Figure 19:
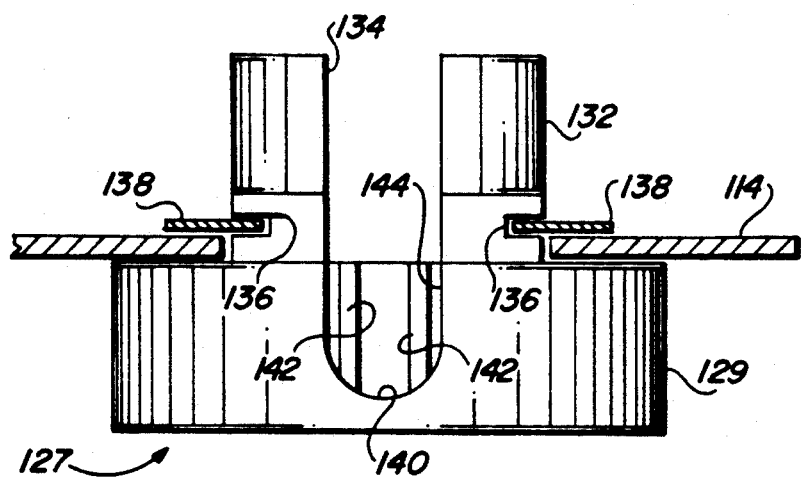
FIG. 19 is a side view, partially cut away, of the elbow junction and a portion of the side surface of the telephone housing shown in FIG. 18.
Figure 20:
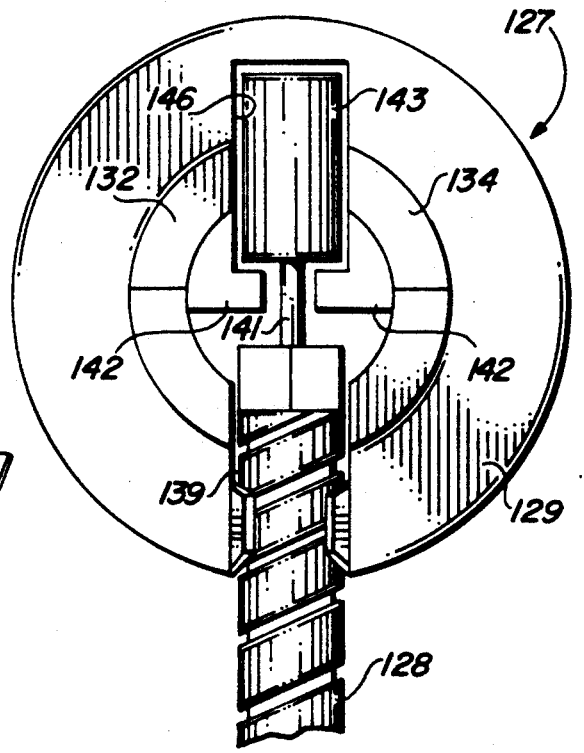
FIG. 20 is a rear elevation of the elbow junction of FIG. 19, illustrating the manner in which the cable stop and the restraint cable are fitted in a parallel fashion in the elbow junction.
Figure 21:
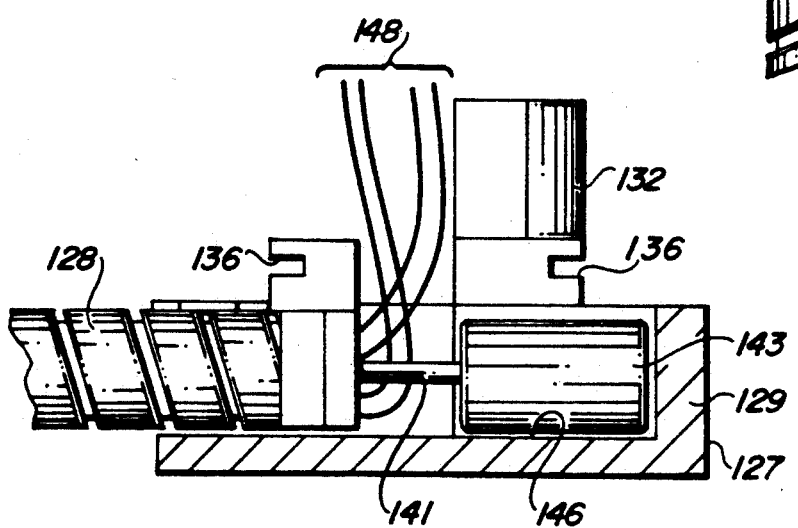
FIG. 21 is a side view, partially cut away, of the elbow junction and restraint cable arrangement shown in FIG. 20.

Referring now to FIGS. 19-21, the elbow 127 is fabricated from a generally flat cylindrical body portion 129 having a pair of prongs 132, 134 which extend into the sidewall 114 of the telephone housing 112 The prongs include a circular groove 136 into which is inserted a C-ring 138 for locking the prongs inside the sidewall 114, much in the manner of the C-ring 175 in FIG. 7 of the above described Drexler et al patent.

The body 129 of the elbow 127 includes a lateral opening 139 dimensioned to receive the armored sheath portion of the assembly 128, with the restraint cable 14 extending across the central portion of the body to a cable stop 143. The body 129 of the elbow 127 includes a pair of locking tabs 142 which extend into the space between the cable stop 143 and the end of the armored sheath of the assembly 128, forming a locking opening 146 for the cable stop 143. As shown in FIG. 21, the electrical wires 148 then extend out of the assembly 128, at a right angle through the body 129 and then into the housing 112 of the telephone 110 shown in FIG. 18. It will thus be appreciated by those skilled in the art that the elbow 127 may be easily retrofitted onto an existing public telephone of the type shown in FIG. 18, by simply removing the existing elbow and then retrofitting the elbow 127 with an armored telephone cord and restraint cable assembly 128 in place, with the elbow 127 holding the armored cord 128 and the cable stop 143 in place.

It will of course be understood that numerous modifications may be made in the anchoring apparatus and methods described above without departing from the spirit and scope of the developments outlined above.

What is claimed is:

1. A telephone handset for use with a public telephone, comprising:
  a handset member having a first end for accepting a handset receiver, a second end for accepting a handset transmitter and an enclosed hollow hand-grip portion between the first and second ends, the hollow hand-grip portion defined by plural sides;
  a restraint cable extending through the handset second end and through the hand-grip portion;
  a removable restraint cable anchor positioned along the hollow hand-grip portion and fixed to the restraint cable; and
  means along at least one of the sides of the handgrip portion for restraining the anchor against movement through the hand-grip portion toward the second end.

2. The telephone handset recited in claim 1 wherein the means for restraining the anchor comprises a ledge along one of the side surfaces, the ledge dimensioned to engage and restrain the anchor from the longitudinal movement through the hand-grip portion toward the second end.

3. The telephone handset recited in claim 1 wherein the restraining means comprises a pair of ledges along opposing internal side surfaces of the hand-grip portion.

4. The telephone handset recited in claim 1 wherein the internal side surface of the hand-grip portion includes an area of increased lateral dimension, and wherein the restraint anchor includes a corresponding surface which is dimensioned to conform to the area of increased dimension.

5. The telephone handset recited in claim 1 wherein the restraint cable comprises an end stop of greater diameter than the restraint cable.

6. The telephone handset recited in claim 5 wherein the restraint anchor has a central longitudinal opening for receiving the restraint cable.

7. The telephone handset recited in claim 6 wherein a portion of the central opening of the anchor has a larger diameter than the remainder thereof, in order to receive and hold the end stop therein.

8. The telephone handset recited in claim 6 wherein the restraint anchor has a longitudinal slot for receiving wires extending along the hand-grip portion to the receiver end.

9. The telephone handset recited in claim 1 wherein the restraining means comprises corner ledges between adjacent internal side surfaces of the hand-grip portion.

10. A telephone handset for use with a public telephone comprising:
   a handset formed of an elongated hollow member having a receiver at a first end and a transmitter at the second end, with an elongated hollow handle between the two ends;
   a handset restraint cable assembly including a restraint cable extending into the handset at one end in a direction generally parallel with the elongated direction of the handle;
   a restraint cable anchor positioned in the handle between the transmitter and receiver ends of the handle for securely holding an end of the restraint cable; and
   means along the inside periphery of the handle for engaging the anchor against movement, and for directing any forces from the restraint cable only along the walls of the handle.

11. The telephone handset recited in claim 10 wherein the anchor comprises a member having a shape generally conforming to the inner periphery of the handle, and wherein the means along the inner periphery comprises an area of substantially increased wall thickness.

12. The telephone handset recited in claim 10 wherein the means along the inner periphery of the handle comprises an area of substantially increased wall thickness, and at least one ledge at the area of increased wall thickness, the ledge protruding from the inner periphery of the handle so as to restrict movement of the anchor toward the transmitter end.

13. The telephone handset recited in claim 12 further comprising a pair of ledges on opposing sides of the inner periphery of the handle.

14. The telephone handset recited in claim 13 wherein the ledges are located along the handle between the first and second ends of the handset.

15. A public telephone having a telephone housing, a handset and an armored cord and restraint cable assembly between the housing and the handset for reducing the risk of vandalism, comprising:
   a handset formed of an elongated hollow member having a transmitter end, a receiver end and an elongated hollow handle between the two ends;
   a restraint cable assembly including a restraint cable extending into the handset at the transmitter end in a direction generally parallel with the elongated direction of the handle;
   an anchor positioned in the handle between the transmitter and receiver ends for securely holding a first end of the armored cord and restraint cable assembly;
   a telephone housing having an elbow bracket extending from a surface of the housing; and
   means for receiving and engaging the second end of the restraint cable assembly within the elbow bracket.

16. The public telephone recited in claim 15 wherein the restraint cable assembly includes an armored sheath, and wherein the elbow bracket includes means for receiving the armored sheath.

17. The public telephone recited in claim 15 wherein the second end of the restraint cable assembly has a stop attached to the restraint cable of the assembly, with the stop having a greater diameter than the restraint cable, the receiving and engaging means holding the stop and restraint cable in a position generally parallel to, and outside the housing surface.

18. The public telephone recited in claim 15 further comprising means for locking the elbow with the housing surface.

19. A public telephone having a telephone housing, a handset and an armored cord and restraint cable assembly between the housing and the handset, comprising:
   a telephone housing having an elbow extending from a surface of the housing; and
   means for extending the end extremity of the armored cord and restraint cable assembly into the elbow bracket outside of the housing.

* * * * *